US012642733B2

(12) United States Patent
Koreeda

(10) Patent No.: US 12,642,733 B2
(45) Date of Patent: Jun. 2, 2026

(54) WHEELCHAIR FOR FOUR-LEGGED ANIMAL

(71) Applicant: Hiroaki Koreeda, Shimabara (JP)

(72) Inventor: Hiroaki Koreeda, Shimabara (JP)

( * ) Notice: Subject to any disclaimer, the term of this patent is extended or adjusted under 35 U.S.C. 154(b) by 337 days.

(21) Appl. No.: 18/690,381

(22) PCT Filed: Jul. 10, 2023

(86) PCT No.: PCT/JP2023/025409
§ 371 (c)(1),
(2) Date: Mar. 8, 2024

(87) PCT Pub. No.: WO2024/018940
PCT Pub. Date: Jan. 25, 2024

(65) Prior Publication Data

US 2024/0374455 A1 Nov. 14, 2024

(30) Foreign Application Priority Data

Jul. 22, 2022 (JP) ................................ 2022-127452
Nov. 24, 2022 (JP) ................................ 2022-198932

(51) Int. Cl.
*A61H 3/00* (2006.01)
*A61H 3/04* (2006.01)

(52) U.S. Cl.
CPC ............... *A61H 3/008* (2013.01); *A61H 3/04* (2013.01); *A61H 2003/007* (2013.01); *A61H 2203/03* (2013.01); *A61H 2230/62* (2013.01)

(58) Field of Classification Search
CPC ....... A01K 15/02; A61H 3/04; A61H 2203/03
See application file for complete search history.

(56) References Cited

U.S. PATENT DOCUMENTS

| | | | | | |
|---|---|---|---|---|---|
| 3,406,661 | A * | 10/1968 | Parkes | A61D 9/00 | 119/727 |
| 4,375,203 | A * | 3/1983 | Parkes | A61D 9/00 | 119/727 |
| 4,821,676 | A * | 4/1989 | Hulterstrum | A61D 9/00 | 119/727 |
| 8,919,291 | B2 * | 12/2014 | De La Celle | A01K 15/027 | 119/727 |
| 10,765,087 | B1 * | 9/2020 | Massey | A61H 3/04 | |
| 2019/0209417 | A1 * | 7/2019 | Laicheng | A61H 3/04 | |
| 2022/0125664 | A1 | 4/2022 | Koreeda | | |

FOREIGN PATENT DOCUMENTS

| | | |
|---|---|---|
| JP | 2015-70816 | 4/2015 |
| WO | 2021/024967 | 2/2021 |

* cited by examiner

*Primary Examiner* — Minnah L Seoh
*Assistant Examiner* — Hosam Shabara
(74) *Attorney, Agent, or Firm* — Muncy, Geissler, Olds & Lowe, P.C.

(57) ABSTRACT

A wheel chair 1A to be used for a four-legged animal that comprises: a healthy limb side holder 2 attached to the healthy limb side body; a impaired limb side holder 3 that is attached to the impaired limb side body and rotatably supports wheels 53; and a pair of connecting members 4 connecting the healthy limb side holder 2 and the impaired limb side holder 3 at the left and right positions of the four-legged animal respectively, wherein the pair of connecting members 4 are configured to be extendable in the longitudinal direction independently of each other.

5 Claims, 10 Drawing Sheets

[Fig.1]
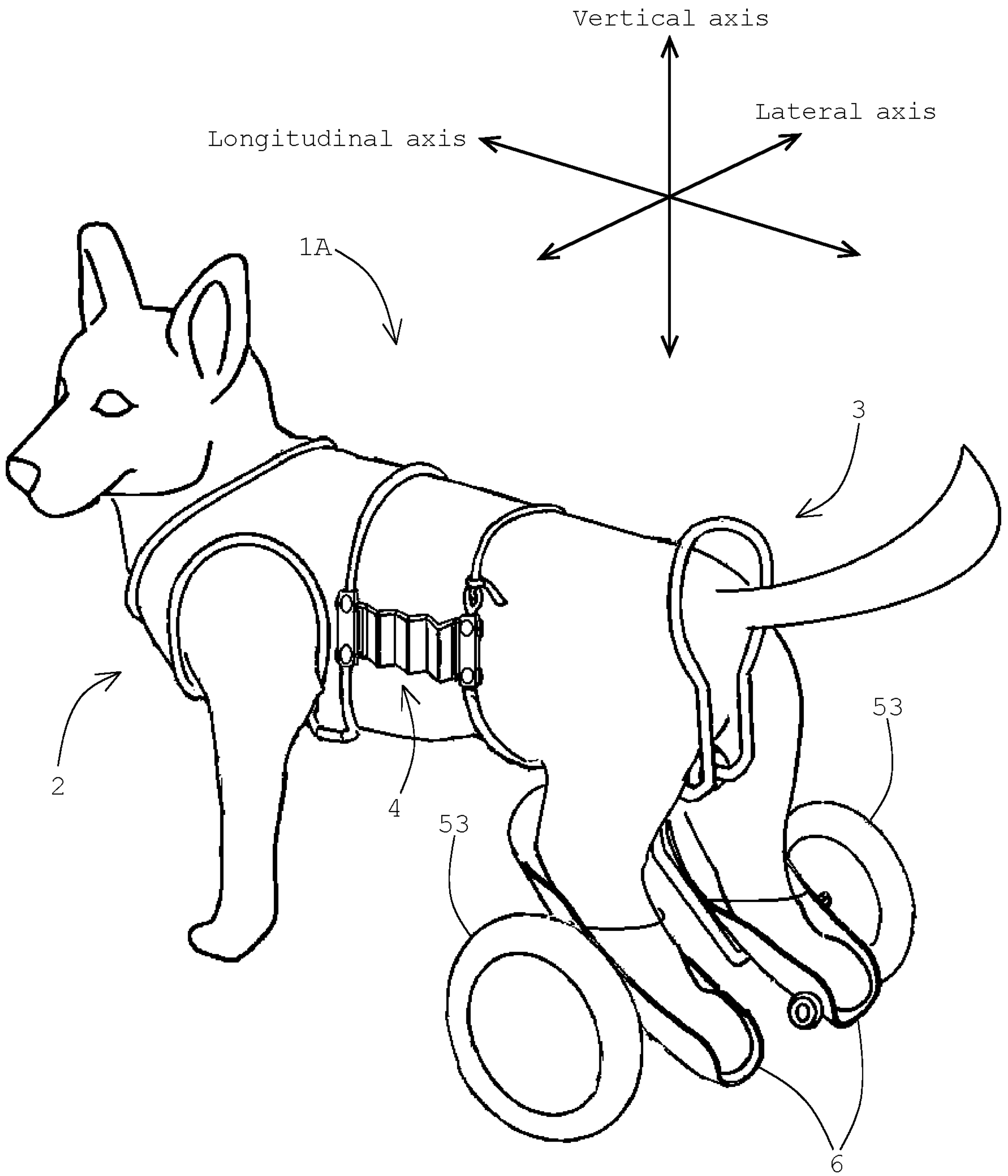

[Fig.2(a)]
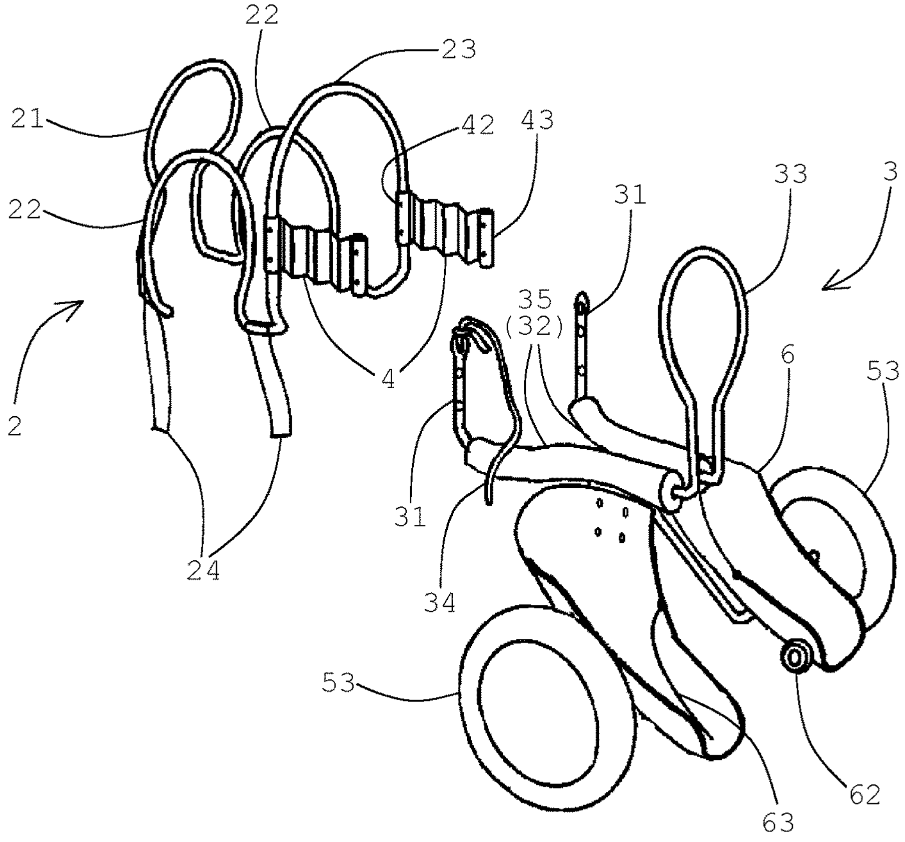
[Fig.2(b)]
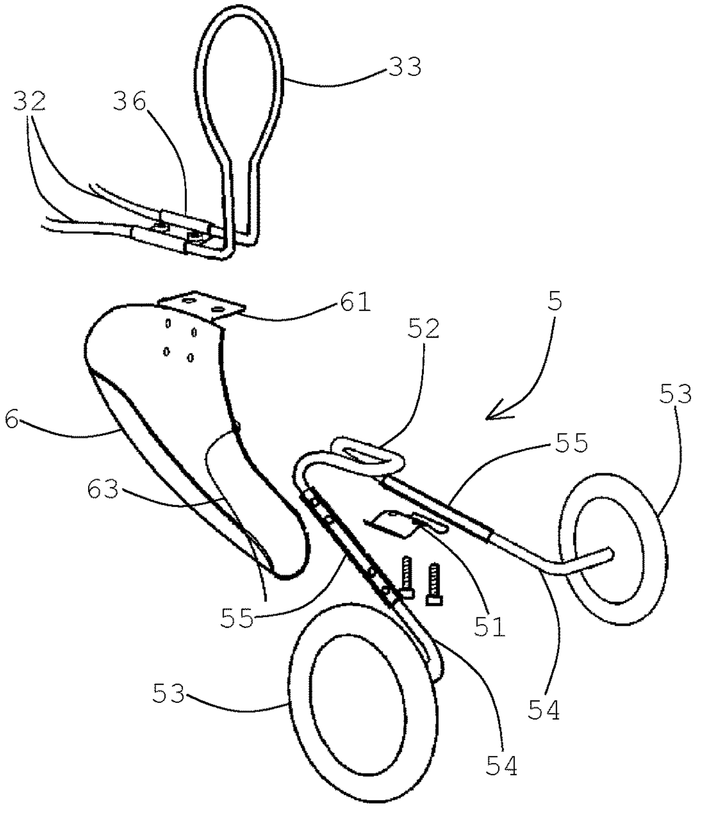

[Fig.3(a)]
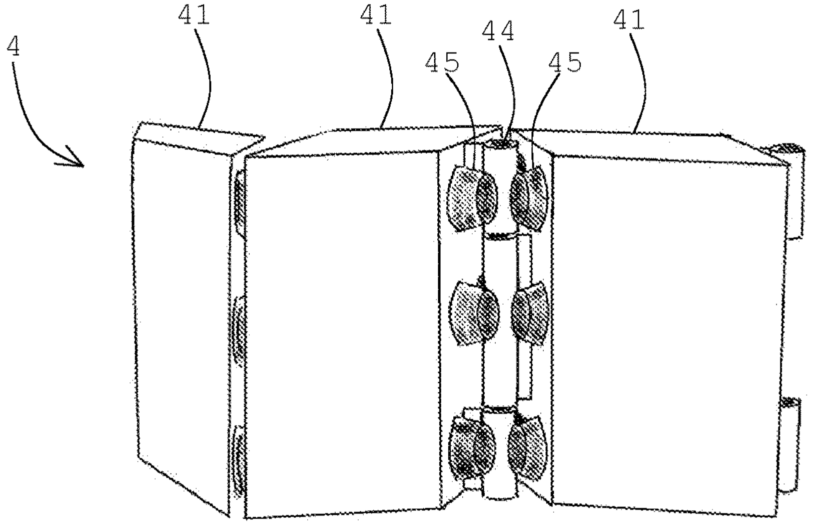
[Fig.3(b)]
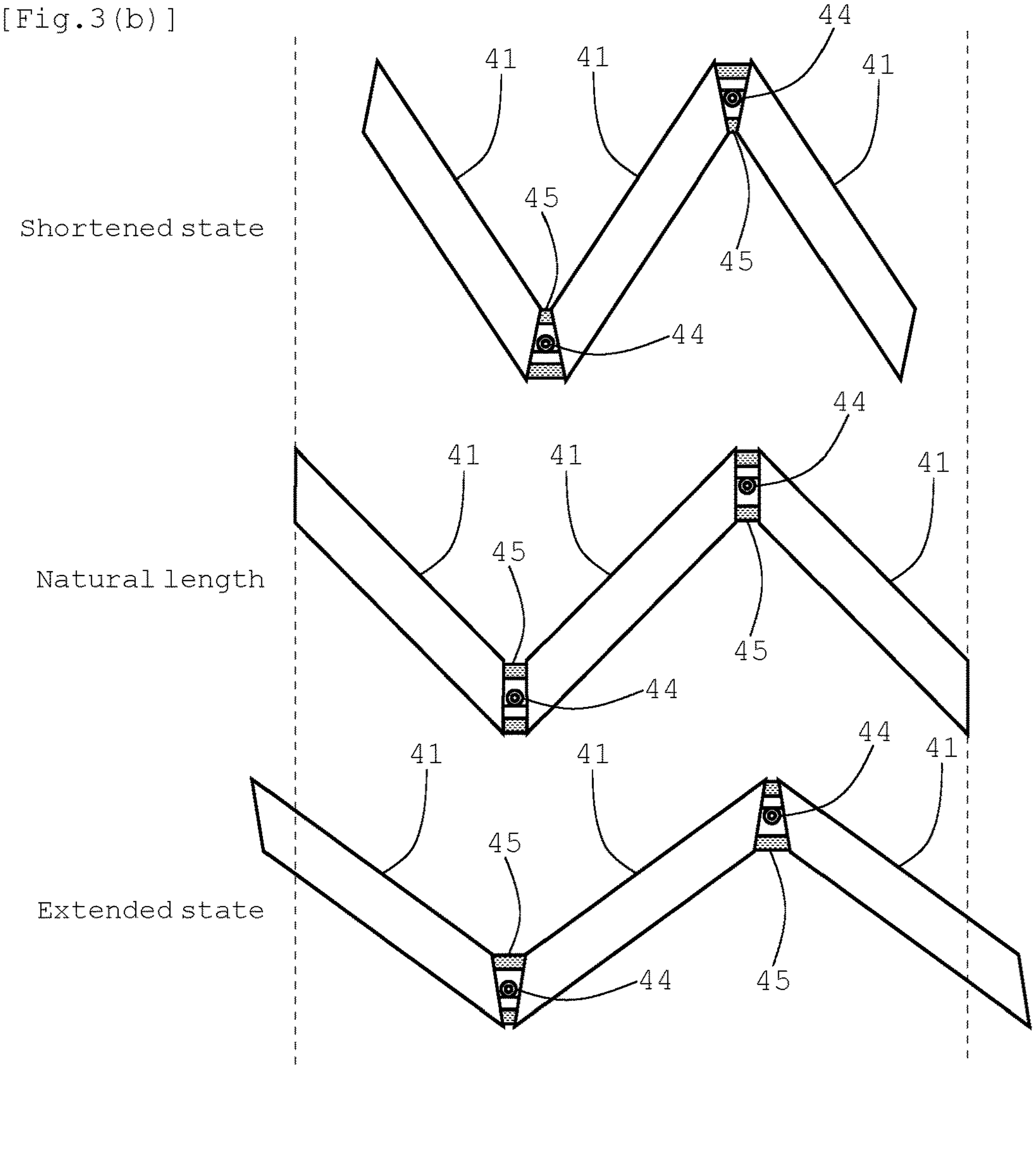

[Fig.4(a)]
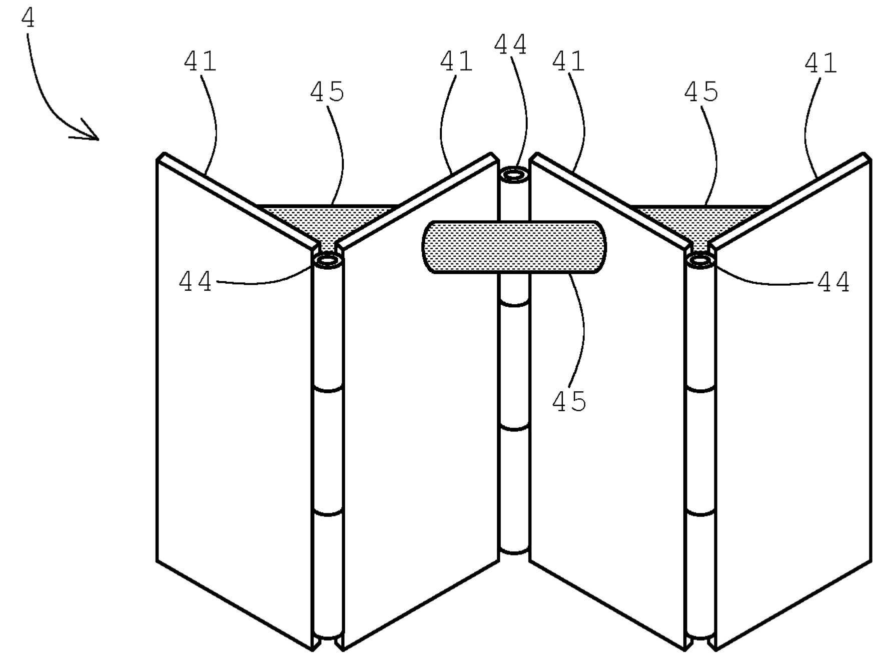
[Fig.4(b)]
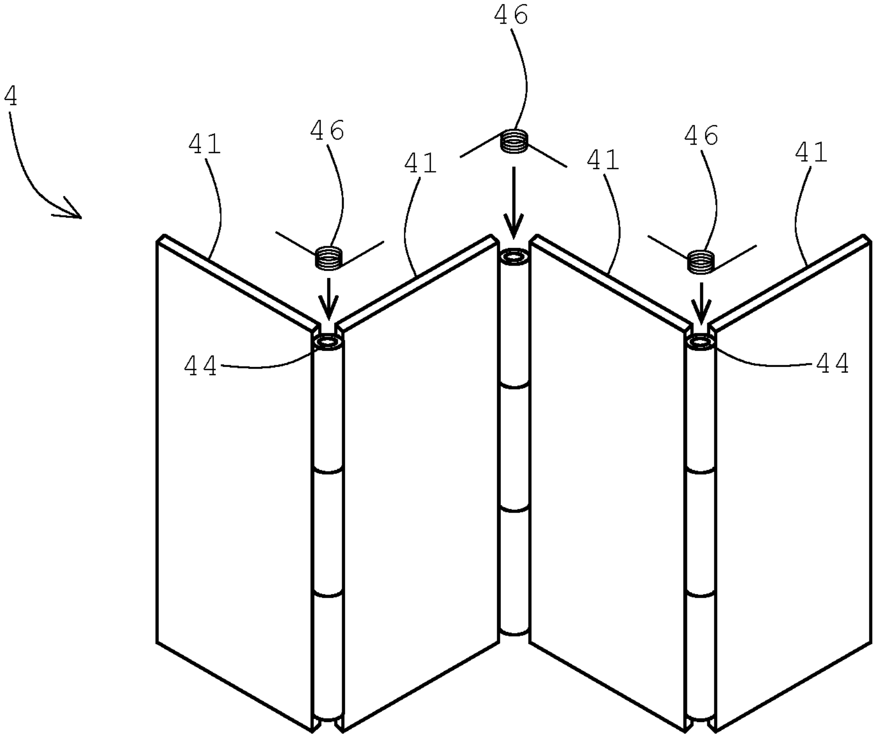

[Fig.5(a)]
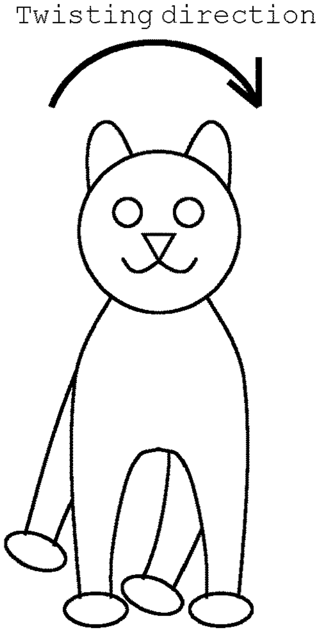
[Fig.5(b)]
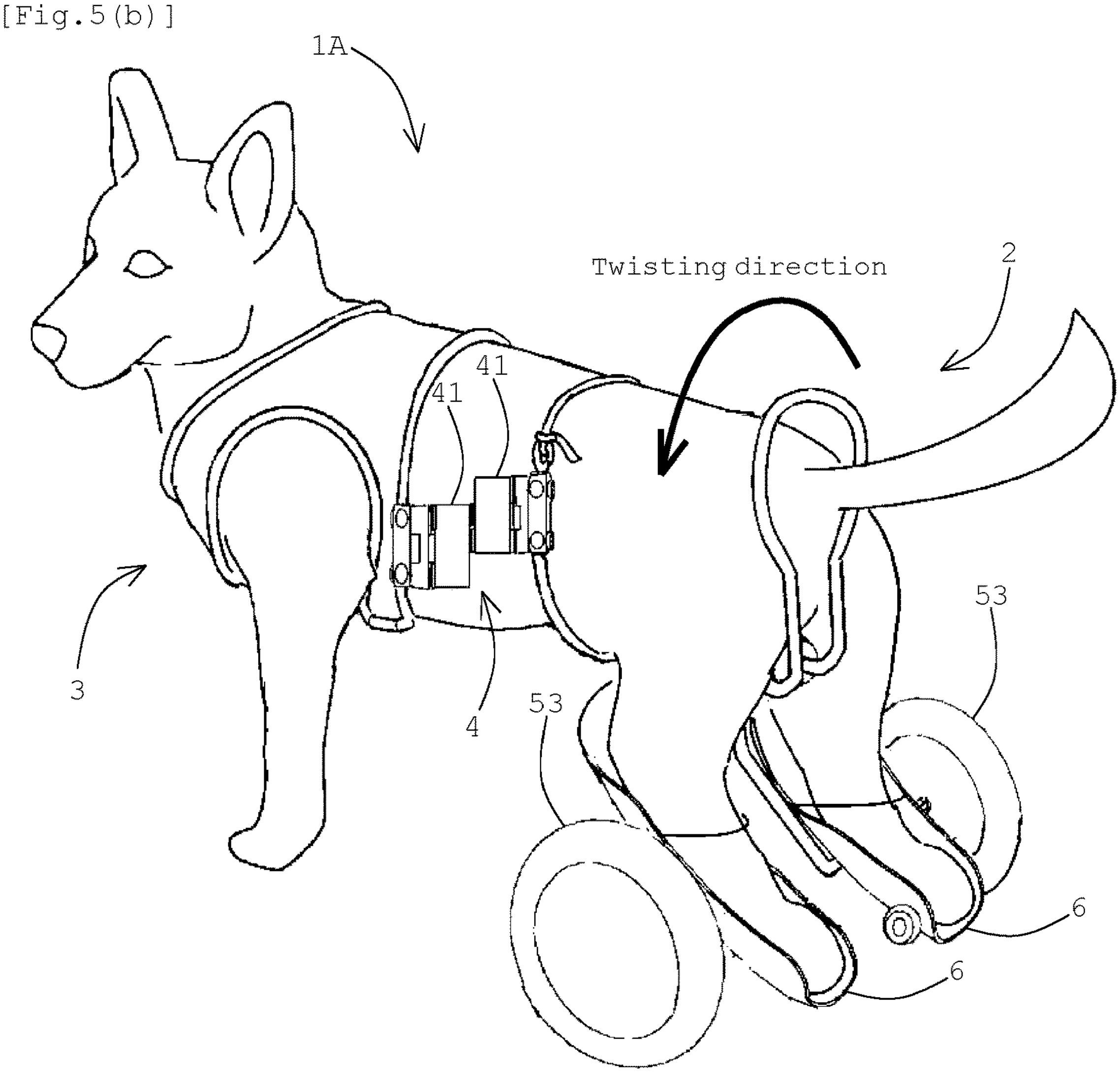

[Fig.6(a)]
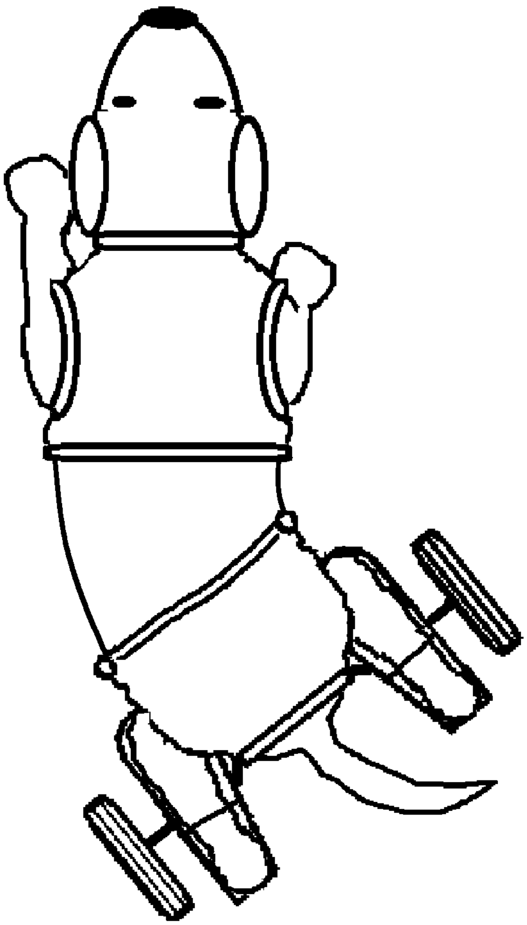
[Fig.6(b)]
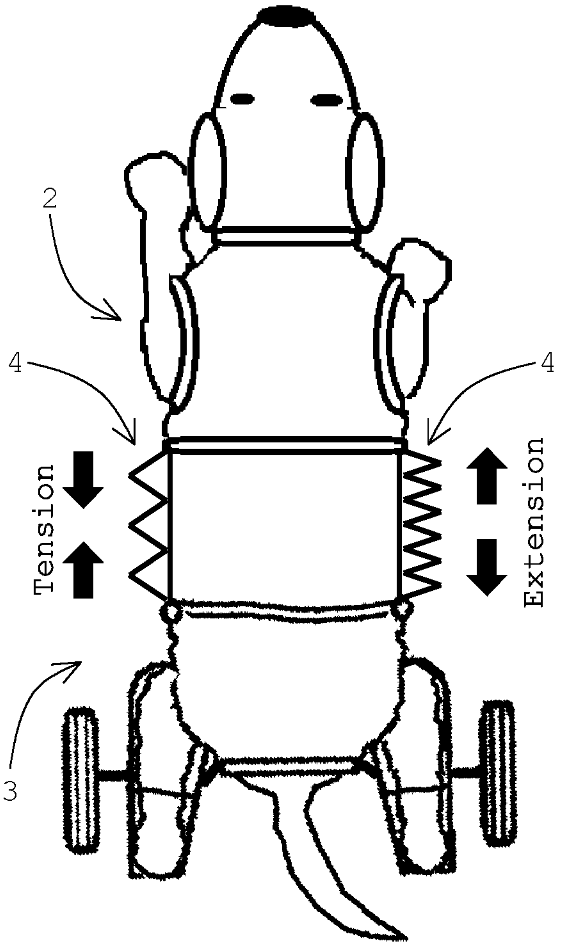

[Fig.7(a)]
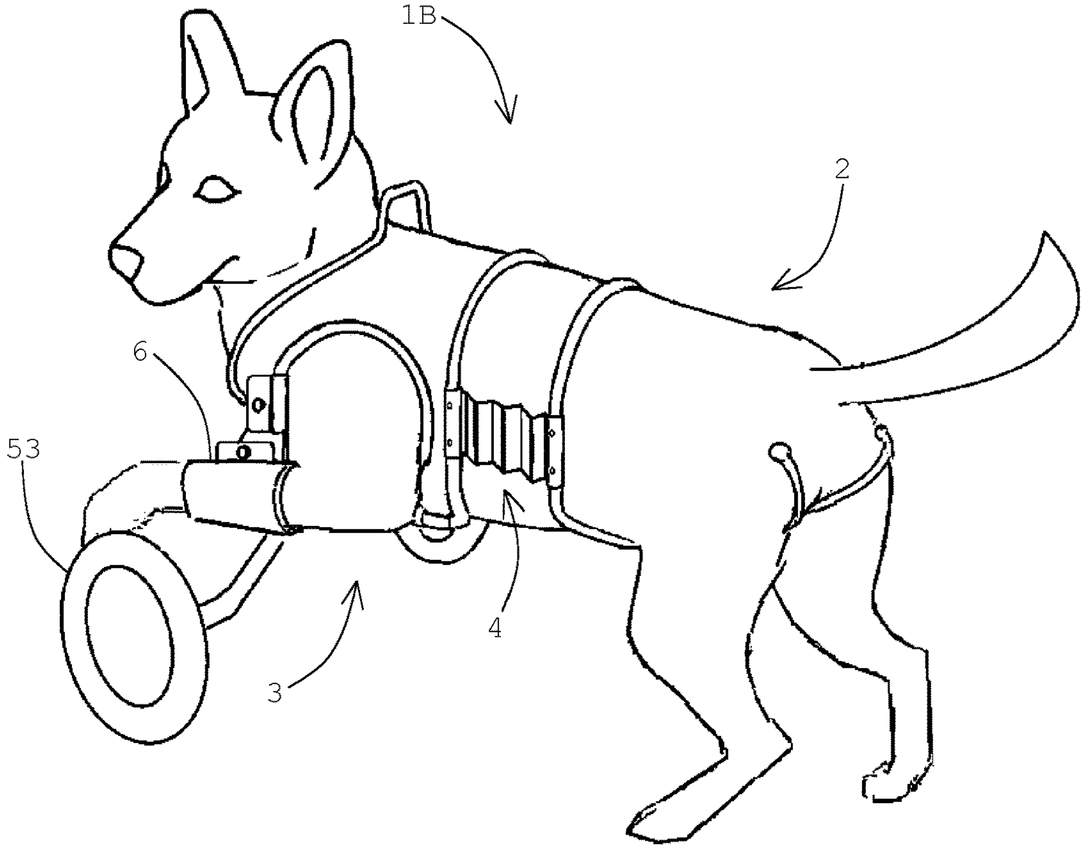
[Fig.7(b)]
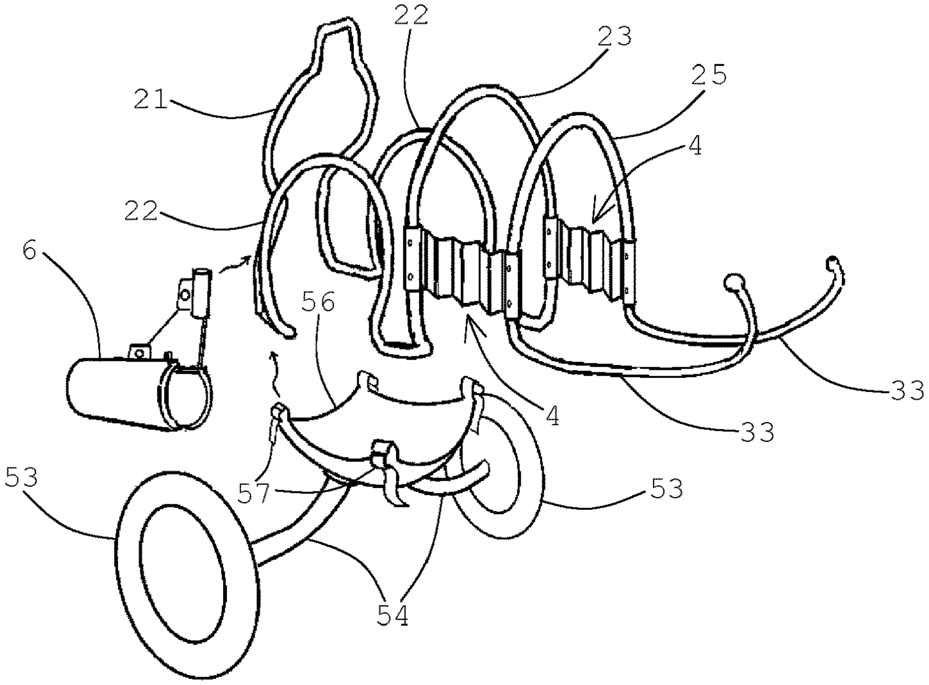

[Fig.8]
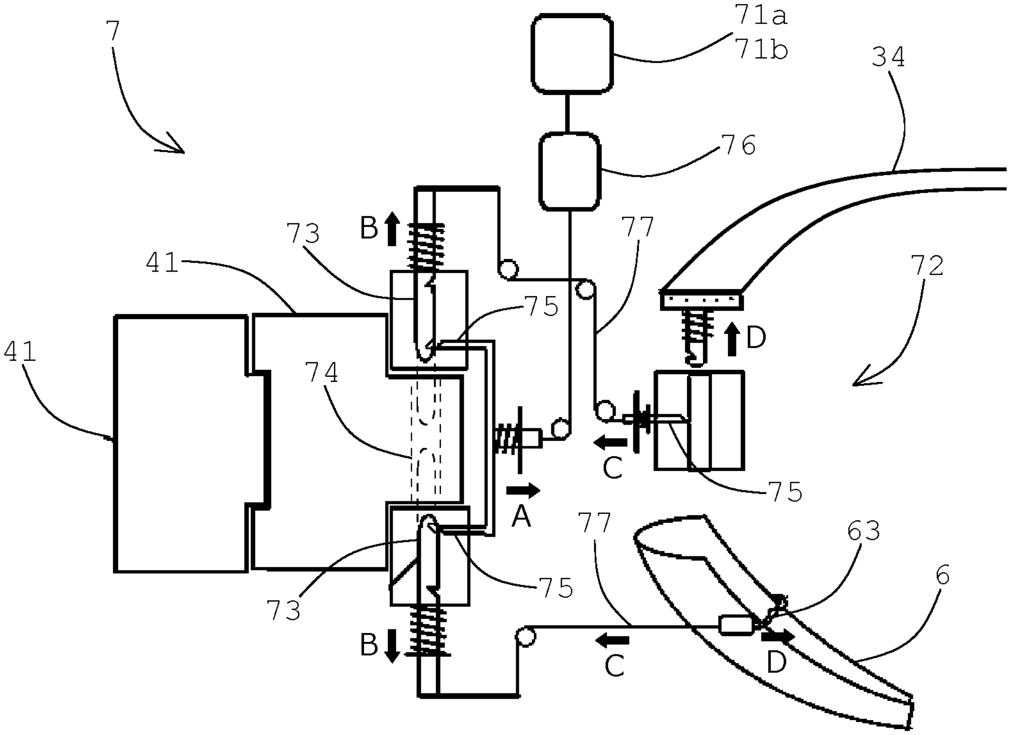

[Fig.9]
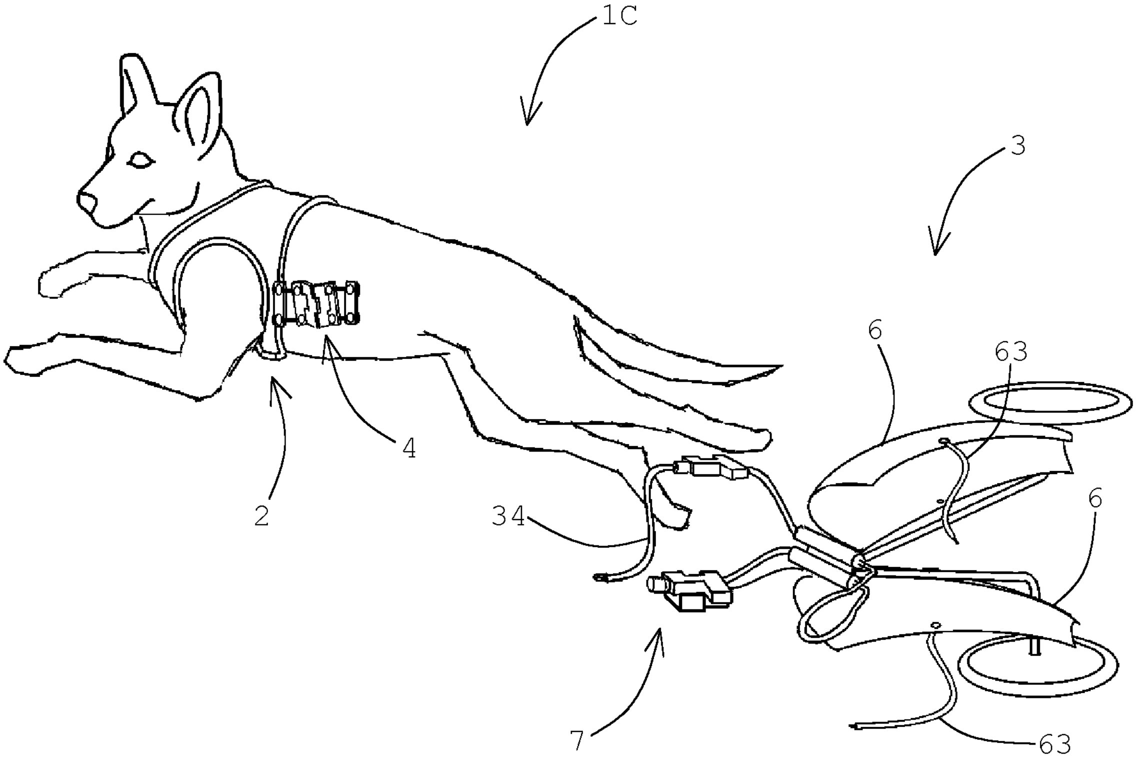

[Fig.10]
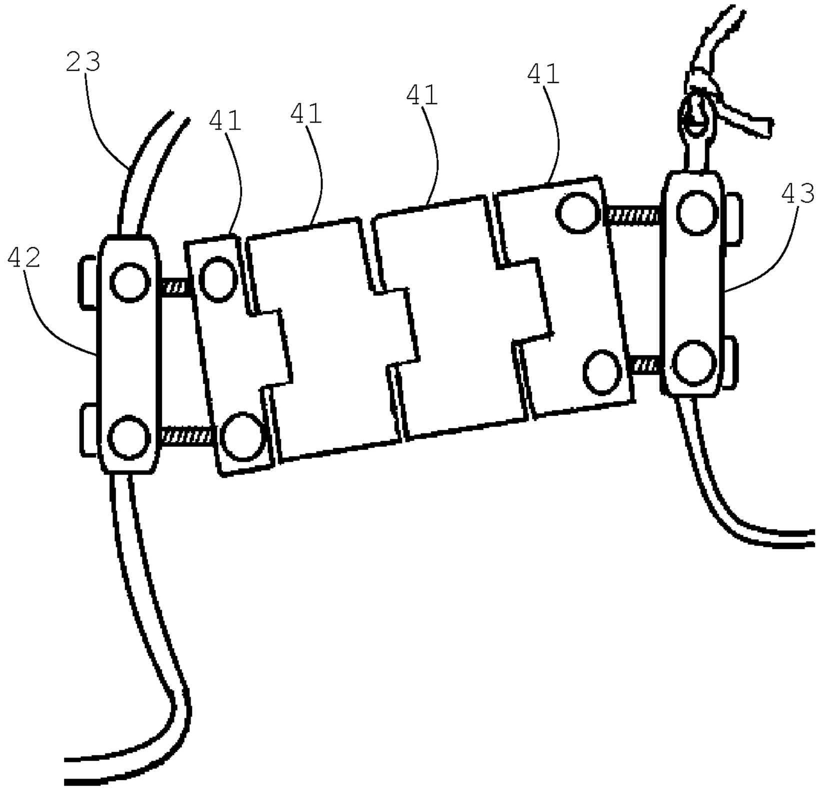

WHEELCHAIR FOR FOUR-LEGGED ANIMAL

TECHNICAL FIELD

The present invention relates to a wheelchair for four-legged animal for a four-legged animal that suffers walking difficulty because its forelimb or hindlimb is paralyzed or amputated or the like due to sickness or an accident and has insufficient motor function.

BACKGROUND ART

Many four-legged animals with impaired forelimbs or hindlimbs that have been paralyzed or amputated or the like due to sickness or accidents tend to walk only with normal limbs while dragging impaired limbs, though muscle forces and body figures vary among individuals. Thus, conventionally, wheelchairs for a four-legged animal for such impaired four-legged animals have been proposed.

For example, Japanese Patent Laid-Open No. 2015-70816 discloses a wheelchair for four-legged animal which having a traction part attached to the shoulder of a quadruped, a support part on which the hind leg side of the quadruped is placed and supported, a pair of wheels attached to the support part, and a connecting rod connecting the traction part and the support part, and can rotate in the left and right directions (Patent Document 1).

CITATION LIST

Patent Literature

Patent Literature 1: Japanese Patent Application Laid-Open No. 2015-70816

SUMMARY OF INVENTION

Technical Problem

Unfortunately, according to the wheelchair for four-legged animal described in Patent Literature 1, the traction part and the support part are connected by only one connecting rod along the direction of the four-legged animals' spine. Therefore, the connection state between the traction part and the support part is unstable, making it difficult to maintain a balance when walking. In addition, because there is only one connecting rod, a load is easily concentrated on a joint part at both ends of the connecting rod, which may easily break.

Furthermore, in Patent Literature 1, the connecting rod and the members for enabling a left-right rotation (first joint and second joint) etc. protrude upward from the body of the four-legged animal. This makes it difficult to attach and handle the four-legged animal, and also causes a decline in design quality and a problem of looking bad, when a four-footed animal's clothing, raincoat, etc. is placed over it.

The present invention has been devised to solve the problem. An object of the present invention is to provide a wheelchair for four-legged animal that improves stability and balance during walking, is easy to attach and handle, has a robust structure without spoiling a design, and yet can allow the four-legged animal to freely curve a body to left or right.

Solution to Problem

A wheelchair for four-legged animal according to the present invention, in order to solve the problem such that improves stability and balance during walking, is easy to attach and handle, has a robust structure without spoiling the design, and yet can allow the animal to freely curve a body to the left or right, the wheelchair for four-legged animal used for a four-legged animal, comprising: a healthy limb side holder attached to a healthy limb side body of the four-legged animal; an impaired limb side holder that is attached to an impaired limb side body of the four-legged animal and rotatably supports wheels; and a pair of connecting members that connect the healthy limb side holder and the impaired limb side holder at the left and right positions of the four-legged animal respectively, wherein the pair of connecting members are configured to be extendable in the longitudinal direction independently of each other.

As an aspect of the present invention, in order to solve the problem of ensuring ease of movement in a left-right direction and preventing falls by allowing mobility around a vertical axis while restricting mobility around a longitudinal and lateral axes, the pair of connecting members may have a hinge structure in which two or more plates are zigzag connected by hinge pins, and the hinge pins may be provided along an almost vertical direction.

Furthermore, as an aspect of the present invention, in order to solve the problem of improving running stability by making it difficult for the healthy limb side holder and the impaired limb side holder to shake in a lateral direction, and reducing physical burden by preventing a body from remaining elongated in a longitudinal direction, the pair of connecting members may configured to restore a natural length by an elastic force when extended from the natural length or shortened from the natural length.

As an aspect of the present invention, in order to solve the problem of correcting a torsion of a body about an anterior-posterior axis to an extent that a balance is not lost, if a body is twisted in a frontal view of the four-legged animal, the pair of connecting members may connected by shifting the plates in an opposite direction of the twisting direction to offset the twisting.

Furthermore, as an aspect of the present invention, in order to solve the problem of correcting a curvature of a body about a vertical axis to an extent that a balance is not lost, if a body is curved in a plan view of the four-legged animal, the pair of connecting members may configured so that a natural length of an outside of a curved portion is shorter than a natural length of an inside of a curved portion so that the healthy limb side holder and the impaired limb side holder are in an almost straight line when worn.

As an aspect of the present invention, in order to solve the problem of preventing accidents such as an injury by struggling or a drowning at an edge of water when a four-legged animal falls while wearing a wheelchair for four-legged animal, the wheelchair for four-legged animal may further include a fall sensor for detecting a change of the four-legged animal from an upright state to a side-lying state or a float switch for detecting that the four-legged animal is in a water, and a locking mechanism that locks a connection state at a predetermined connection part in the wheelchair for four-legged animal, wherein a lock state by the locking mechanism may unlocked when the fall sensor detects the side-lying state of the four-legged animal or when the float switch detects that the four-legged animal is in a water.

Advantageous Effect of Invention

The present invention improves stability and balance during walking, is easy to attach and handle, has a robust structure without spoiling a design, and yet can allow the four-legged animal to freely curve a body to left or right.

BRIEF DESCRIPTION OF DRAWINGS

FIG. 1 illustrates a four-legged animal that wears a first embodiment of a wheelchair for four-legged animal according to the present invention.

FIG. 2(*a*) illustrates a state which the healthy limb side holder and the impaired limb side holder are separated, and FIG. 2(*b*) illustrates a state which the impaired limb side holder is separated from the wheel support mechanism and the impaired limb cover in the first embodiment.

FIG. 3(*a*) illustrates the connecting member of the first embodiment, and FIG. 3(*b*) illustrates a shortened state, a natural length, and an extended state of the connecting member according to other examples in the first embodiment.

FIG. 4(*a*) illustrates another arrangement example of restoring members, and FIG. 4(*b*) illustrates an arrangement example of another restoring members.

FIG. 5(*a*) illustrates the four-legged animal whose body is twisted in the frontal view, and FIG. 5(*b*) illustrates the connecting member when a body is twisted in a front view in the first embodiment.

FIG. 6(*a*) illustrates the four-legged animal whose body is curved in the plan view, and FIG. 6(*b*) illustrates the connecting member when a body is curved in a plan view in the first embodiment.

FIG. 7(*a*) illustrates a four-legged animal that wears a second embodiment of a wheelchair for four-legged animal according to the present invention, and FIG. 7(*b*) illustrates an exploded view of a wheelchair for four-legged animal according to the second embodiment.

FIG. 8 illustrates a locking mechanism in the third embodiment of the wheelchair for four-legged animal according to the present invention.

FIG. 9 illustrates a four-legged animal in a state of being out of a wheelchair for four-legged animal of the third embodiment.

FIG. 10 illustrates another example of a connecting member that offsets twisting in the front view.

DESCRIPTION OF EMBODIMENTS

A first embodiment of a wheelchair for four-legged animal according to the present invention will be described below in accordance with the accompanying drawings.

A wheelchair for four-legged animal 1A of the first embodiment is used for a four-legged animal whose hindlimbs are impaired limb as illustrated in FIG. 1. In the first embodiment, the four-legged animal is a dog but is not limited thereto. The present invention is applicable to all animals walking with four legs. In the following description, indicated directions are shown by using the longitudinal direction, the lateral direction, and the vertical direction of a four-legged animal.

As illustrated in FIGS. 1 and 2(*a*), the wheelchair for four-legged animal 1A of the first embodiment mainly includes a healthy limb side holder 2 attached to a healthy limb side body of the four-legged animal, an impaired limb side holder 3 that is attached to an impaired limb side body of the four-legged animal, and a pair of connecting members 4,4 that connect the healthy limb side holder 2 and the impaired limb side holder 3. The configurations will be described below.

The healthy limb side holder 2 is attached to the healthy limb side body of the four-legged animal and is composed of a rod-like material such as a metal pipe. Specifically, as illustrated in FIG. 1 and FIG. 2(*a*), the healthy limb side holder 2 includes an arch-shaped neck part 21 that is arranged around a neck of the four-legged animal, a pair of arch-shaped limb part 22 that are provided behind the neck part 21 on the left and right sides and are arranged around a base of a healthy limb (forelimb), and an arch-shaped girth part 23 that is provided behind the limb part 22 and is arranged around a body.

In the first embodiment, as illustrated in FIG. 2(*a*), a chest belt 24 is provided to connect a connection between the neck part 21 and each limb part 22, and a connection between each limb part 22 and the girth part 23, respectively, in a left-right direction. The chest belt 24 is adjustable in length by means of hook and loop fasteners or the like to fit the healthy limb side holder 2 to a healthy limb side body.

The impaired limb side holder 3 is attached to the impaired limb side body of the four-legged animal and is composed of the same rod-like material as the healthy limb side holder 2. Specifically, as illustrated in FIGS. 1 and 2(*a*), the impaired limb side holder 3 includes a pair of vertical part 31 provided in an almost vertical direction along both sides of the body of the four-legged animal, a pair of abdominal support part 32 extended backward from the lower end of each vertical part 31 to support the abdomen, and an arch-shaped tail part 33 provided at a rear end of each abdominal support part 32 and arranged around a tail.

In the first embodiment, each vertical part 31 is provided with a waist belt 34 that connects its upper ends to each other in the lateral direction, as illustrated in FIGS. 1 and 2(*a*). By spanning the waist belt 34 over the waist of the four-legged animal, swaying during walking and bouncing of the waist due to voluntary or involuntary movements are prevented, which in turn prevents the body from falling out of the impaired limb side holder 3.

In this first embodiment, as illustrated in FIG. 2(*a*), the abdominal support part 32 is covered with a saddle member 35 made of a cushion material or the like to reduce impact and pain on the abdomen. The saddle member 35 is provided with a predetermined gap in the lateral direction to prevent pressure on the pubic area but is not limited to this shape. Furthermore, in this first embodiment, as illustrated in FIG. 2(*b*), a support plate 36 is provided to bridge the pair of abdominal support part 32. The wheel support mechanism 5 and the impaired limb cover 6 are fixed to the support plate 36.

The wheel support mechanism 5 is composed of the same rod-shaped material as the healthy limb side holder 2. Specifically, as illustrated in FIG. 2(*b*), the wheel support mechanism 5 has an almost U-shaped fixing part 52 that is screw-fixed to the support plate 36 by means of a holding plate 51, and a pair of leg part 54 that extend from the fixing part 52 to a rear on both sides to rotatably support a wheel 53. The length of each leg part 54 is extendable and adjustable by means of an adjuster 55.

The impaired limb cover 6 is formed of a lightweight, flexible material such as plastic. Specifically, the impaired limb cover 6 is formed in a gently curved semi-cylindrical shape, as illustrated in FIGS. 1 and 2(*b*), and holds the impaired limb in a wrapping manner. A L-shaped plate 61 is provided at the upper end of the impaired limb cover 6 for screw-fixing to the support plate 36, and a safety wheel 62 is rotatable at the lower end of the impaired limb cover 6 to prevent the impaired limb cover 6 from rubbing against the undulations of the ground, etc.

Furthermore, as illustrated in FIGS. 2(*a*) and 2(*b*), the impaired limb cover 6 is provided with a impaired limb belt 63 that connects the rear end edges each other in the lateral direction. By spanning the impaired limb belt 63 over the impaired limb of the four-legged animal, the impaired limb is prevented from falling off the impaired limb cover 6 due to shaking during walking.

In this first embodiment, the wheels 53 are rotatably supported on the impaired limb side holder 3 using the wheel support mechanism 5, but this configuration is not limited to this. For example, the wheels 53 may be rotatably supported directly on the impaired limb cover 6 without the wheel support mechanism 5.

The connecting member 4 connects the healthy limb side holder 2 and the impaired limb side holder 3. In this first embodiment, the connecting members 4 are provided in pairs to connect the healthy limb side holder 2 and the impaired limb side holder 3 at the left and right positions of the four-legged animal, respectively, as illustrated in FIG. 2(*a*). Each connecting member 4 is configured to be extendable in the longitudinal direction independently of each other so that the four-legged animal can freely bend its body in the lateral direction.

Specifically, as illustrated in FIG. 1 to 3, the connecting member 4 includes two or more plates 41 connected in a zigzag shape, a front attaching member 42 that attaches the plate 41 at a front end to the healthy limb side holder 2, and a rear attaching member 43 that attaches the plate 41 at a rear end to the impaired limb side holder 3.

The front attaching member 42 is removably provided on the almost vertical portions at the right and left sides of the girth part 23 of the healthy limb side holder 2 and attaches the plate 41 at the front end. The rear attaching member 43 is removably provided on a pair of vertical part 31 on the right and left sides of the impaired limb side holder 3 and attaches the plate 41 at the rear end.

As illustrated in FIGS. 3(*a*) and 3(*b*), each plate 41 is formed in an almost parallelogram shape in cross-sectional view and has a hinge structure connected in a zigzag manner by hinge pins 44. The connecting member 4 is provided between the healthy limb side holder 2 and the impaired limb side holder 3 so that each hinge pin 44 is aligned along an almost vertical direction. Each hinge pin 44 is located at an almost central position on a connecting surface of the plates 41 that are connected to each other.

In this first embodiment, restoring members 45 having elasticity are provided on the connecting surfaces facing each other on both sides of each hinge pin 44. Therefore, as illustrated in FIG. 3(*b*), when the connecting member 4 is shortened from its natural length, the restoring member 45 inside a bending part is compressed and the restoring member 45 outside a bending part is elongated, thus the connecting member 4 is restored to its natural length. When the connecting member 4 is extended from its natural length, the restoring member 45 inside a bending part is extended and the restoring member 45 outside a bending part is compressed, so that the connecting member 4 is restored to its natural length.

In other words, when the pair of connecting members 4 are elongated from its natural length or shortened from its natural length, it is restored to its natural length by an elastic force of the restoring members 45. In this first embodiment, the restoring members 45 are provided on each of the connecting surfaces of the plates 41 connected to each other, as illustrated in FIG. 3(*a*), but it may be adhered so as to bridge the connecting surfaces of the plates 41 connected to each other, as illustrated in FIG. 3(*b*).

Although the restoring members 45 are composed of rubber, it is not limited to this configuration, but can be compressed and extended, such as a coil spring. Furthermore, the restoring members 45 may be placed on the inner side of a bending portion of the plate 41, as illustrated in FIG. 4(*a*), or coil springs 46 may be placed around the hinge pins 44, as illustrated in FIG. 4(*b*).

The connecting members 4 are not limited to the hinge structure described above but can be extendable in the longitudinal direction independently of each other. For example, the connecting members 4 itself may be composed of a coil spring, rubber member, etc., or various extendable mechanisms such as a bellows structure or a lattice structure used for a grabber, etc. may be used. The plates 41 may be made of lightweight plastic material, flexible rubber material, or the like.

Here, the functions required for the connecting members 4 to connect the healthy limb side holder 2 to the impaired limb side holder 3, as well as its mobility and flexibility, are discussed. In the following explanation, the lateral axis along the lateral direction, the longitudinal axis along the longitudinal direction, and the vertical axis along the vertical direction of the four-legged animal are described, respectively, as illustrated in FIG. 1.

(1) General Functions

Generally, when a four-legged animal with an impaired limb walks while wearing a wheelchair, a certain amount of weight must be applied to a healthy limb in order to kick the ground without slipping with the healthy limb. For this reason, it is preferable that the connecting members 4 that connects the healthy limb side holder 2 and the impaired limb side holder 3 have a function to transfer the weight of the impaired limb side to the healthy limb side by using the ground contact point of the wheel 53 as a fulcrum.

(2) Mobility in the Lateral Axes

Many four-legged animals with paralytic hindlimbs pull their hindlimbs toward the abdomen like a shrimp due to involuntary movements or have a rocking habit. Therefore, if the connecting members 4 have too wide a range of motion or too much flexibility with respect to the lateral axis, the ground contact point of the wheels 53 may be too close to forward, causing the animal to fall backward as if it were falling on its buttocks. Therefore, mobility and flexibility in the lateral axes are not so necessary for the connecting members 4, and a slight range of motion to be able to absorb vibration during walking is sufficient.

(3) Mobility in the Longitudinal Axis

Some four-legged animals with paralytic disorders or deficiencies in legs have stiffened muscles in the legs and buttocks, and depending on their lifestyle, some individuals do not have a symmetrical posture in a standing position. Such individuals have a torsion (a twist about the longitudinal axis) in the body in the frontal view from a face side of a four-legged animal. Therefore, if a movable range of the connecting members 4 in the longitudinal axis is too narrow or its flexibility is too weak, a wheelchair and a body may not fit and may be created a gap.

On the other hand, if a movable range of the connecting members 4 in the longitudinal axis is too wide or too flexible, an orientation of the wheels 53 may shift slightly oblique to the longitudinal direction in response to twisting of the body. Therefore, it is preferable that the healthy limb side holder 2 and the impaired limb side holder 3 can be connected for an individual that is twisted with respect to the longitudinal axis so as to offset the twisting in order to return the body to a state that does not disrupt a running balance. On the other hand, for an individual whose body is not twisted with respect to the longitudinal axis, a range of motion and flexibility in the longitudinal axis is not so necessary, and a slight range of motion to be able to absorb vibration is sufficient.

(4) Mobility in the Vertical Axis

If a body of a four-legged animal is not curved in plan view, i.e., if a body is not curved with respect to the vertical axis, there is no danger of tipping over even if a range of motion in the vertical axis is wide, and in fact, it is easier to change direction. However, when a pair of connecting members 4 is arranged at the left and right positions of a four-legged animal, a length of the longitudinal direction changes separately on the left and right sides, so elasticity in the longitudinal direction is required.

On the other hand, in the case of a four-legged animal with a curved body in plan view or an individual with a biased swaying habit to either one of the left or right side, the body is curved in an almost L-shape in plan view. Therefore, it is preferable that the healthy limb side holder 2 and the disabled limb side holder 3 can be connected in a pre-curved state in the opposite direction so that they are in an almost straight line when worn, in order to return the body to a state that is not disrupted a running balance.

From the above, to summarize the mobility and flexibility required for the connecting members 4, for individuals whose bodies are not twisted or curved, mobility and flexibility in the lateral and longitudinal axes are not necessary, and mobility and flexibility in at least the vertical axis are sufficient. On the other hand, for individuals whose bodies is twisted or curved, it is preferable to have a configuration that can be adjusted to offset such twisting or curvature.

Based on the above points, in this first embodiment, the hinge structure described above is adopted as a configuration that the connecting members 4 to be extendable in the longitudinal direction independently of each other while having few parts and a simple configuration, and to realize the mobility, flexibility, and adjustment functions required in the lateral axis, longitudinal axis, and vertical axis described above.

However, as illustrated in FIG. 5(*a*), when four-legged animals with a twisted body in the frontal view due to muscle stiffness or limb amputation is fitted with a wheelchair for the four-legged animal 1A of the above configuration, the twisting may cause the healthy limb side holder 2 and impaired limb side holder 3 to shift relatively in relation to the longitudinal axis, which may disrupt a running balance.

Therefore, for four-legged animals that are twisted as described above, as illustrated in FIG. 5(*b*), a pair of left and right connecting members 4 are connected by shifting the plates 41 in an opposite direction of the twisting direction so that the twisting is offset. Specifically, the plates 41 with different heights of the shaft tube into which the hinge pin 44 is inserted are connected. This corrects the twisting of the body to an extent that it does not disrupt balance, thereby improving stability and balance when walking, as well as providing rehabilitation to improve twisting due to muscle stiffness, etc.

As illustrated in FIG. 6(*a*), when four-legged animals with a curved body or a habit of swaying to one side or the other in a planar view is fitted with a wheelchair for four-legged animal 1A of the above configuration, the healthy limb side holder 2 and the impaired limb side holder 3 are connected at an angle in a planar view due to their curvature or swaying habit. This may cause the animal to lose its running balance.

Therefore, for four-legged animals with the above curvature, as illustrated in FIG. 6(*b*), the left-and-right pair of connecting members 4 are configured so that a natural length of an outside of a curved portion is shorter than a natural length of an inside of a curved portion so that the healthy limb side holder 2 and the impaired limb side holder 3 are in an almost straight line when worn. This is achieved by differentiating a number, size, shape, etc. of the 41 plates on the left and right sides.

According to the above configuration, the connecting member 4 inside the curved portion is compressed more than its natural length, thus exerting an external force in the direction of extension. On the other hand, the connecting member 4 outside the curved portion is extended beyond its natural length, thus exerting an external force in the tensile direction. As a result, the curvature of a body is corrected to an extent that balance is not lost, thereby improving stability and balance when walking. The concept of almost straight line between the healthy limb side holder 2 and the impaired limb side holder 3 when worn is not limited to a strictly straight line, but also includes a near straight line.

Next, the operations of the wheelchair for four-legged animal 1A of the first embodiment will be described below.

In this first embodiment of the wheelchair for four-legged animal 1A, as illustrated in FIG. 1, in a normal walking state, an abdominal support part 32 of the impaired limb side holder 3 supports the impaired limb side body, and the impaired limb cover 6 covers the impaired limb. Then, the wheel support mechanism 5 rotatably supports a pair of wheels 53 so that the impaired limb cover 6 does not rub against a ground or the like. As a result, the pair of wheels 53 takes the place of the disabled limbs, enabling four-legged animals to walk smoothly even with only its healthy limbs.

A pair of connecting members 4 connect the healthy limb side holder 2 and the impaired limb side holder 3 at a left and right positions of the four-legged animal, respectively. This stabilizes a connection state between the healthy limb side holder 2 and the impaired limb side holder 3, making it easier to maintain balance during walking. In addition, by having a pair of connecting members 4 on each side, a load applied during walking is dispersed, preventing easy breakage. Furthermore, each connecting member 4 is arranged along a side of a body, making it less bulky. This makes it easy to attach to the four-legged animal and to handle, and also makes it easier to cover it with clothing, a raincoat, etc., without degrading its design.

In addition, because a pair of connecting members 4 are configured to be extendable in the longitudinal direction independently of each other, four-legged animals can freely curve its body in the lateral direction and smoothly change direction. This makes it easier for four-legged animals to go in a direction they want to go or to avoid obstacles, etc., thereby alleviating stress when walking in the wheelchair for four-legged animal 1A. Furthermore, when a pair of connecting members 4 are extended beyond their natural length or shortened beyond their natural length, they are restored to their natural length. This makes it difficult for the healthy limb side holder 2 and the impaired limb side holder 3 to shake in the lateral direction, which improves running stability. In addition, a physical burden is reduced because the body is prevented from remaining extended in the longitudinal direction.

In this first embodiment, each connecting member 4 has a hinge structure connected by hinge pins 44 along the vertical direction. This configuration allows mobility around the vertical axis and ensures ease of movement in the lateral direction. In addition, since mobility around the longitudinal and lateral axes is restricted, tipping over is prevented.

Furthermore, each connecting member 4 transfers a weight of the impaired limb side to the healthy limb side with the ground contact point of the wheel 53 as a fulcrum, making it difficult for the healthy limb to slip when it kicks the ground.

Furthermore, in this first embodiment, for a four-legged animal whose body is twisted in the frontal view as illustrated in FIG. 5(*a*), the connecting member 4 connected by shifting the plates 41 in the opposite direction of the twist cancels out the twist as illustrated in FIG. 5(*b*). This corrects the body twisting to an extent that balance is not lost, thereby improving stability and balance during walking, as well as providing rehabilitation to improve twisting due to muscle stiffness, etc.

In this first embodiment, as illustrated in FIG. 6(*a*), for a four-legged animal with a curved body in plan view or a four-legged animal with a habit of swaying to the left or right, the connecting members 4, which are configured so that a natural length of an outside of a curved portion is shorter than a natural length of an inside of a curved portion, makes the healthy limb side holder 2 and the impaired limb side be in almost straight line as illustrated in FIG. 6(*b*). This corrects a curvature of the body to a degree that does not disrupt balance, thereby improving stability and balance when walking. In addition, even individuals with swaying habits will be able to walk in a straight line.

The first embodiment of the wheelchair for four-legged animal 1A according to the present invention as described above achieves the following effects:

1. The wheelchair for four-legged animal 1A improves stability and balance during walking, is easy to attach and handle, has a robust structure without spoiling a design, and yet can allow the four-legged animal to freely curve a body to left or right.
2. The wheelchair for four-legged animal 1A allows mobility around the vertical axis, while mobility around the longitudinal and lateral axes is restricted, thereby being able to ensure ease of movement in the lateral direction and preventing tipping over.
3. The wheelchair for four-legged animal 1A make the healthy limb side holder 2 and the impaired limb side holder 3 difficult to shake in the left-right direction to improve running stability and can restrain the body from remaining elongated in the longitudinal direction to reduce physical burden.
4. The wheelchair for four-legged animal 1A can correct a twisting of a body about the longitudinal axis to a degree that does not disrupt balance.
5. The wheelchair for four-legged animal 1A can correct a curvature of a body about the vertical axis to a degree that does not disrupt balance.

A second embodiment of the wheelchair for four-legged animal according to the present invention will be described below. Among the configurations of the second embodiment, the configurations identical or equivalent to those of the first embodiment described above are indicated by the same reference numerals, and a redundant explanation thereof is omitted.

The first embodiment described above describes the wheelchair for four-legged animal 1A for four-legged animals whose hind limbs are impaired limbs, but the feature of this second embodiment is that it is configured as a wheelchair for four-legged animal 1B for four-legged animals whose front limbs are impaired limbs.

Specifically, as illustrated in FIGS. 7(*a*) and 7(*b*), the impaired limb side holder 3 is formed in the same shape as the healthy limb side holder 2 of the first embodiment described above, and the wheel support mechanism 5 and the impaired limb cover 6 are fixed to it.

As illustrated in FIG. 7(*b*), the wheel support mechanism 5 has a chest cover 56 that supports a chest of a four-legged animal and a pair of leg parts 54 that extend from a bottom of the chest cover 56 to a left and right rear to rotatably support wheels 53. The chest cover 56 is removably attached to the impaired limb side holder 3 by means of fasteners 57 such as buckles provided at four locations in the front, rear, left and right. The impaired limb cover 6 is formed in a tubular shape that can hold the forelimb and is fixed to the limb part 22.

As illustrated in FIG. 7(*b*), the healthy limb side holder 2 is simpler than the impaired limb side holder 3 of the first embodiment described above, and has an arch-shaped waist part 25 that is placed around the waist of the four-legged animal, and a pair of abdominal support parts 32 that are extended backward from the lower end of this waist part 25 to support an abdomen. The rear end of each abdominal support part 32 is curved upward along a buttock and its tip is spherical to prevent injury.

In this second embodiment, the front end of the connecting member 4 is removably attached to a vertical portion of the girth part 23 of the impaired limb side holder 3 at a left and right positions by a front mounting member 42. On the other hand, the rear end of the connecting member 4 is removably attached to the vertical portion of the waist part 25 of the healthy limb side holder 2 at a left and right positions by a rear mounting member 43.

The second embodiment of the wheelchair for four-legged animal 1B according to the present invention as described above achieves same effects as the first embodiment described above.

Next, the third embodiment of the wheelchair for four-legged animal 1C according to the present invention will be described. Among the configurations of the third embodiment, the configurations identical or equivalent to those of the first embodiment described above are indicated by the same reference numerals, and a redundant explanation thereof is omitted.

A feature of this third embodiment is that an automatic escape mechanism 7 is provided for enable a four-legged animal to automatically escape from the wheelchair for four-legged animal 1C when four-legged animals fall over or fall into water. The third embodiment is configured as the wheelchair for four-legged animal 1A of the first embodiment described above with the automatic escape mechanism 7.

Many four-legged animals with impaired limbs can crawl with their normal limbs when not wearing a wheelchair. However, if they fall while wearing a wheelchair and become in a side-lying position, they simply struggle with their chest and abdomen pointing slightly upward, which can cause skin tears and injuries in areas where there is no sense of pain and thin muscles. In addition, if they fall over at the edge of water, such as at the edge of a wave, or falls into water such as a river or pond, it could be life-threatening. For this reason, they may wear a floatation device beforehand, but if the body floats too much, it becomes difficult for them to swim.

Therefore, in this third embodiment, as illustrated in FIG. 8, the automatic escape mechanism 7 includes a fall sensor 71*a* for detecting a change of the four-legged animal from an upright state to a side-lying state or a float switch 71*b* for detecting that the four-legged animal is in a water, and a locking mechanism 72 that locks a connection state at a predetermined connection part. The lock state by the locking mechanism 72 is unlocked when the fall sensor 71*a* detects the side-lying state of the four-legged animal or when the float switch 71*b* detects that the four-legged animal is in a water.

Specifically, as illustrated in FIG. 8, a locking mechanism 72 is provided at a connection part between the rear end of the connecting member 4 and the impaired limb side holder 3. In the upright state, a pair of lock pins 73, which are exerted outwardly by a spring or the like, are inserted into lock holes 74 of the plate 41 and are locked by locking claws 75 to maintain the connection state. Similarly, at one end of the waist belt 34 connecting upper ends of the vertical part 31 of the impaired limb side holder 3 each other and at one end of the impaired limb belt 63 connecting end edges of the impaired limb cover 6 each other, the lock pins 73 are locked by the locking claws 75 to maintain the connection state.

On the other hand, when the fall sensor 71*a* detects a fall, or when the float switch 71*b* detects that the four-legged animal is in the water, an electromagnetic switch 76 evacuates the locking claws 75 locked on the lock pin 73 (arrow A in FIG. 8). As a result, each lock pin 73 is evacuated from the lock hole 74 by a spring (arrow B in FIG. 8), and the connection between the rear end of the connecting member 4 and the impaired limb side holder 3 is released. Each of the lock pins 73 evacuated from the lock hole 74 also evacuates the locking pawl 75 that locks the waist belt 34 and the impaired limb belt 63 via wire 77 (arrow C in FIG. 8). This also disconnects each of the waist belt 34 and the impaired limb belt 63.

Then, as illustrated in FIG. 9, the impaired limb side holder 3 is completely separated from the healthy limb side holder 2, and the impaired limb side holder 3 itself is also separated from the impaired limb. Therefore, the four-legged animal can turn its body to a semi-upright position with only an upper body upright or crawl with the healthy limb after a fall because the impaired limb side body is free. In addition, if the four-legged animal falls into a water, they are prevented from sinking into a water by a weight of the impaired limb side holder 3 and can swim with their healthy limbs.

The third embodiment of the wheelchair for four-legged animal 1C according to the present invention as described above achieves same effects as the first embodiment described above. In addition, when a four-legged animal falls over while wearing the wheelchair for four-legged animal 1C, secondary damage such as an injury by struggling or a drowning at an edge of water can be prevented.

In the third embodiment described above, the locking mechanism 72 is applied to a connection part between the connecting member 4 and the impaired limb side holder 3, and to a connection part between the waist belt 34 and the impaired limb belt 63, but it is not limited to this configuration. The locking mechanism 72 may be applied to any connection part as long as it is separated to the extent that four-legged animal can exit the wheelchair for four-legged animal 1C on its own.

The fall sensor 71*a* may be selected from a non-contact sensor, such as a tilt sensor or gyro sensor, which detects that the four-legged animal has changed from an upright position to a side-lying position, or a contact sensor, which detects the side-lying position when a button is pressed. Furthermore, the float switch 71*b* should be capable of detecting a presence of liquid without false detection during rainfall or water play.

The wheelchair for four-legged animal according to the present invention is not limited to the foregoing embodiments and can be properly changed.

For example, in the first embodiment described above, for a four-legged animal that is twisted in the frontal view, the plates 41 comprising the connecting member 4 are shifted in the opposite direction of the twist to offset the twist. However, it is not limited to this configuration, as long as the healthy limb side holder 2 and the impaired limb side holder 3 can be shifted around the longitudinal axis and connected. For example, as illustrated in FIG. 10, the plates 41 at both ends may be fixed to the front mounting member 42 and the rear mounting member 43 in an inclined state.

In each of the above described embodiments, rubber, coil springs, etc. are used as the restoring members 45, but a elasticity (flexibility) of them may be configured to be adjustable. For example, in the case of the restoring member 45 of the first embodiment, each rubber on both sides of the hinge pin 44 may be made compressible with a screw or the like, and the elasticity may be adjusted according to how tight it is.

Furthermore, the shape and material of the healthy limb side holder 2 and the impaired limb side holder 3 are not limited to the above configurations, as long as the configuration allows them to be attached to and firmly hold the healthy limb side body and the impaired limb side body, respectively. In each of the above described embodiments, since the connecting member 4 is a hinge structure, each connecting member 4 may be covered with a bellows or other cover to prevent body hair and body of the four-legged animal from being pinched.

REFERENCE SIGNS LIST

1A, 1B, 1C Wheelchair for four-legged animal
2 Healthy limb side holder
3 Impaired limb side holder
4 Connecting member
5 Wheel support mechanism
6 Impaired limb cover
7 Automatic escape mechanism
21 Neck part
22 Limb part
23 Girth part
24 Chest belt
25 Waist part
31 Vertical part
32 Abdominal support part
33 Tail part
34 Waist belt
35 Saddle member
36 Support plate
41 Plate
42 Front attaching member
43 Rear attaching member
44 Hinge pin
45 Restoring member
46 Coil spring
51 Holding plate
52 Fixing part
53 Wheel
54 Leg part
55 Adjuster
56 Chest cover
57 Fixing tool
61 L-shaped plate
62 Safety wheel
63 Impaired limb belt
71*a* Fall sensor
71*b* Float switch

72 Lock mechanism
73 Lock pin
74 Lock hole
75 Locking claw
76 Electromagnetic switch
77 Wire

The invention claimed is:

1. A wheelchair for four-legged animal used for a four-legged animal, comprising:

a healthy limb side holder attached to a healthy limb side body of the four-legged animal;

an impaired limb side holder that is attached to an impaired limb side body of the four-legged animal and rotatably supports wheels; and a pair of connecting members that connect the healthy limb side holder and the impaired limb side holder at the left and right positions of the four-legged animal respectively, wherein the pair of connecting members are configured to be extendable in the longitudinal direction independently of each other and have a hinge structure in which two or more plates are connected in a zigzag shape by hinge pins, and the hinge pins are provided along a vertical direction.

2. The wheelchair for four-legged animal according to claim 1, wherein the pair of connecting members are configured to restore a natural length by an elastic force when extended from the natural length or shortened from the natural length.

3. The wheelchair for four-legged animal according to claim 1, wherein if a body is twisted in a frontal view of the four-legged animal, the pair of connecting members are connected by shifting the plates in an opposite direction of the twisting direction to offset the twisting.

4. The wheelchair for four-legged animal according to claim 1, wherein if a body is curved in a plan view of the four-legged animal, the pair of connecting members are configured so that a natural length of an outside of a curved portion is shorter than a natural length of an inside of a curved portion so that the healthy limb side holder and the impaired limb side holder are in a straight line when worn.

5. The wheelchair for four-legged animal according to claim 1, further comprising:

a fall sensor for detecting a change of the four-legged animal from an upright state to a side-lying state or a float switch for detecting that the four-legged animal is in a water; and a locking mechanism that locks a connection state at a predetermined connection part in the wheelchair for four-legged animal, wherein a lock state by the locking mechanism is unlocked when the fall sensor detects the side-lying state of the four-legged animal or when the float switch detects that the four-legged animal is in a water.

* * * * *